July 24, 1934. J. L. BARR 1,967,219
VEHICLE LIFTING DEVICE
Original Filed March 28, 1929   3 Sheets-Sheet 1
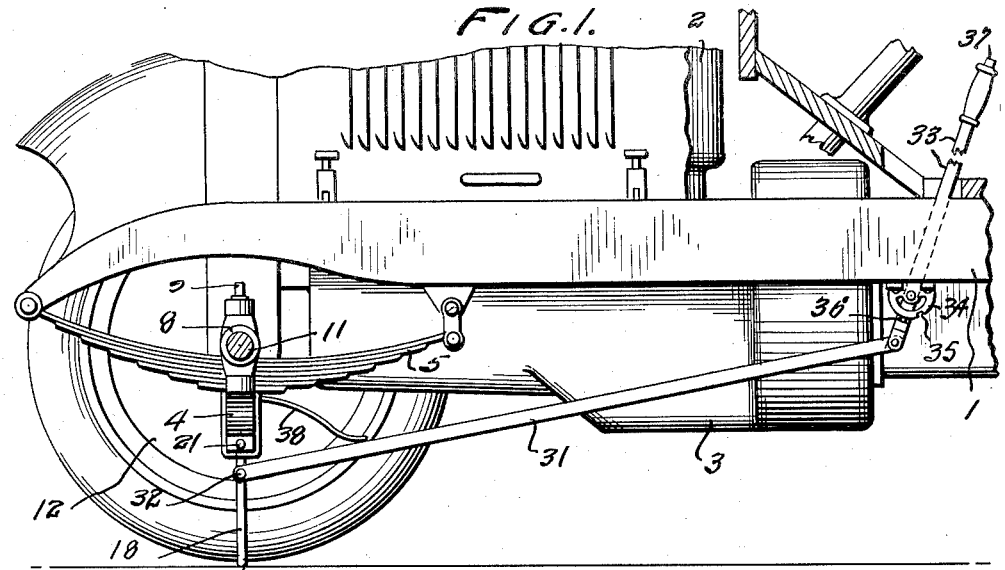
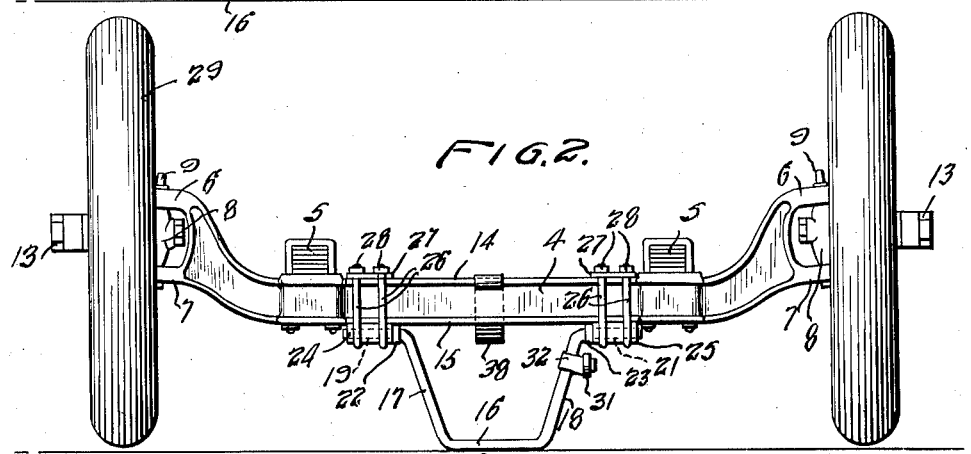
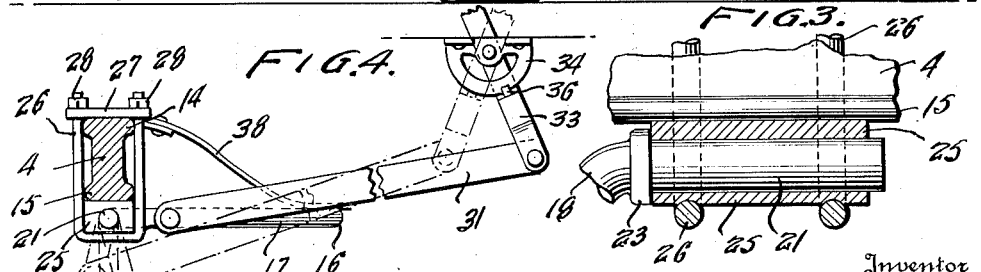
Inventor
JOHN L. BARR July 24, 1934.　　　　J. L. BARR　　　　1,967,219
VEHICLE LIFTING DEVICE
Original Filed March 28, 1929　　3 Sheets-Sheet 2
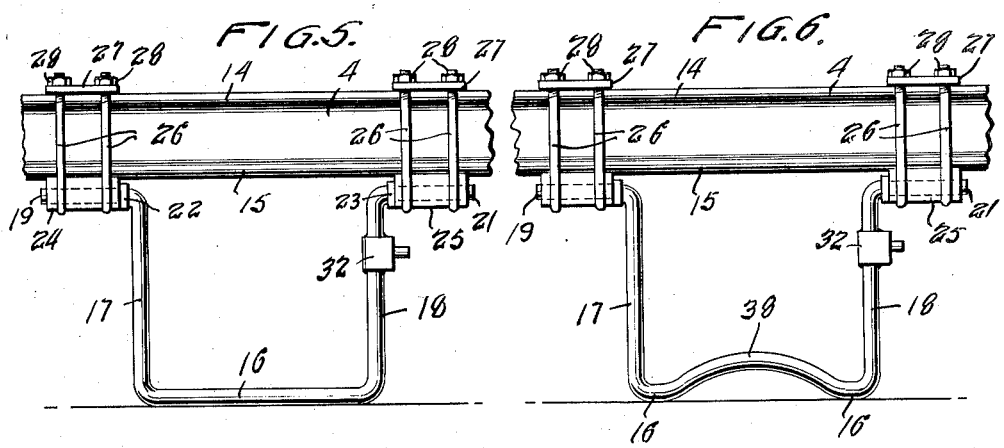
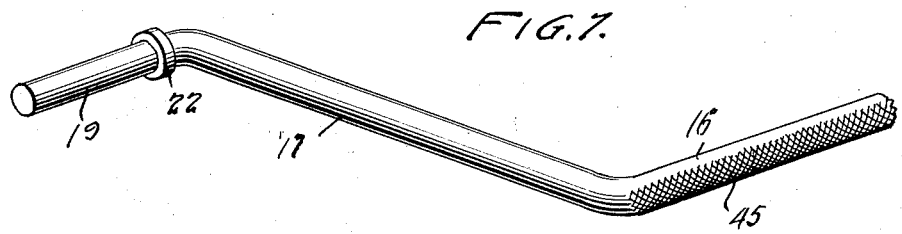
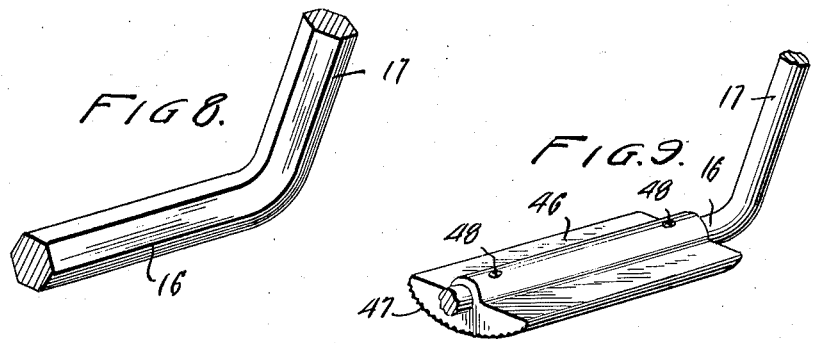
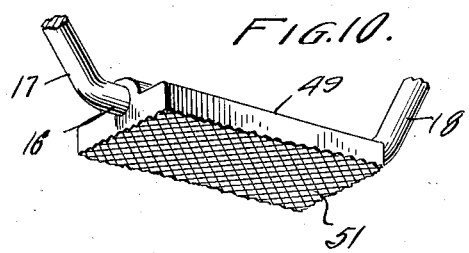
Inventor
JOHN L. BARR
Attorneys July 24, 1934.   J. L. BARR   1,967,219
VEHICLE LIFTING DEVICE
Original Filed March 28, 1929   3 Sheets-Sheet 3
FIG. 11.
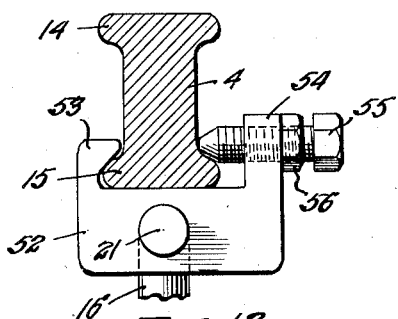
FIG. 12.
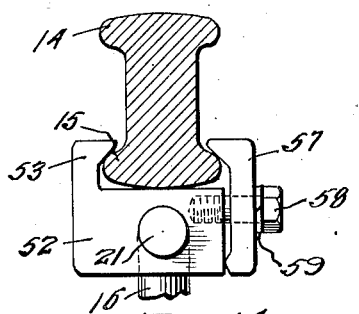
FIG. 13.
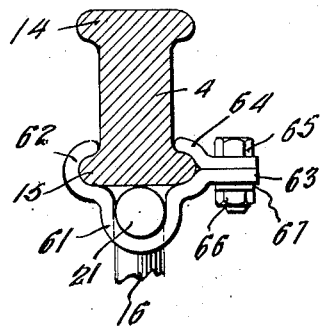
FIG. 14.
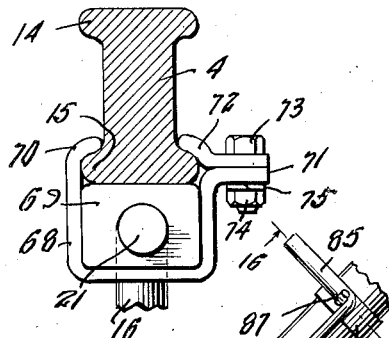
FIG. 16.
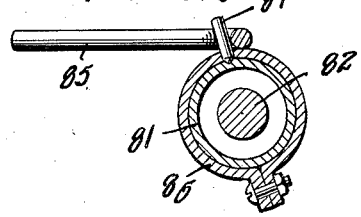
FIG. 15.
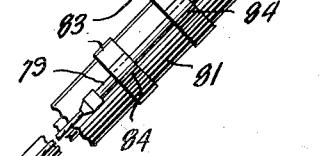
FIG. 17.
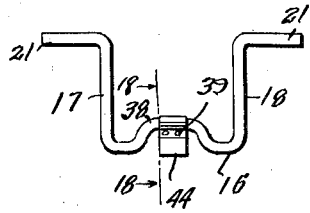
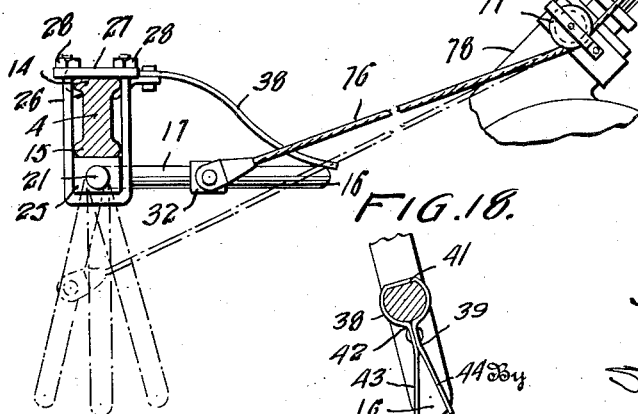
FIG. 18.
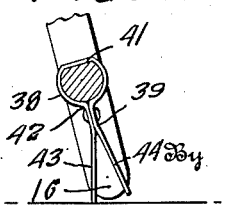
Inventor
JOHN L. BARR
Attorneys Patented July 24, 1934

1,967,219

UNITED STATES PATENT OFFICE 1,967,219

VEHICLE LIFTING DEVICE

John Lester Barr, Chevy Chase, Md.

Application March 28, 1929, Serial No. 350,685
Renewed June 10, 1933

15 Claims. (Cl. 280—150)

This invention relates in general to lifting devices and more particularly has reference to an apparatus for lending facility to turning the wheels with which steering is effected when operating a vehicle in confined areas.

Previous to this time in operating a vehicle in confined areas, such as are often encountered when parking on busy thoroughfares, extreme difficulty is sometimes experienced in turning the wheels of a car, when momentarily stationary, while maneuvering for the desired position of the vehicle. In the same manner it has often been a task taxing the energies of a driver to manipulate the steering mechanism of a vehicle to afford passage out into a thoroughfare from between vehicles parked in the front and rear.

Heretofore there have been provided devices to aid in the turning of a vehicle wheel with which the steering is effected, while in a stationary position, but such apparatus is usually attended by certain disadvantages that this invention seeks to overcome. In general the prior devices have provided for lifting one wheel of a car from contact with the road bed, but it is manifest that such expedients have not afforded as great an ease of steering as is desirable under such conditions. Furthermore those devices have not been provided with a contact surface of a character suitable for supporting an end of a vehicle free of both wheels, besides not affording sufficient road clearance for the vehicle.

An object of this invention is to provide an apparatus for relieving the weight of a vehicle upon the wheels with which the steering of the same is effected.

Another object of this invention is to provide an apparatus for simultaneously elevating the wheels with which the steering of a vehicle is effected, upon movement of the vehicle, to lend facility in turning the wheels while the vehicle is stationary.

A further object of this invention is to provide an apparatus for relieving the weight on the wheels of a vehicle, with which the steering is effected, which apparatus may be operated by the driver while guiding the vehicle.

A still further object of this invention is to provide an apparatus for simultaneously elevating the front wheels of a vehicle which may be readily attached to the axle of a conventional car without any modification in the structure thereof.

With these and other objects in view which may be incident to my improvements, the invention consists in the parts and combinations to be hereinafter set forth and claimed, with the understanding that the several necessary elements comprising my invention, may be varied in construction, proportions and arrangement, without departing from the spirit and scope of the appended claims.

In order to make my invention more clearly understood, I have shown in the accompanying drawings means for carrying the same into practical effect, without limiting the improvements in their useful applications to the particular construction, which for the purpose of explanation, have been made the subject of illustration.

This invention consists in general of a device which may be mounted on the under side of the front axle of a vehicle and lowered to the roadway whereby upon movement of the car the front wheels may be simultaneously elevated or the weight thereon sufficiently relieved to permit a free turning of the steering mechanism of the vehicle.

In the drawings forming a part of this specification:

Figure 1 is a side elevational view partly in section showing the device forming the subject matter of this invention mounted on the under side of the front axle of the vehicle.

Figure 2 is a front view of the device shown mounted on the under side of the vehicle axle.

Figure 3 is a front sectional view showing the manner of pivoting the support on the under side of the vehicle axle.

Figure 4 is a side elevational view showing the manner of positioning the support.

Figure 5 is a front elevational view of a modification of the support shown in Figures 1 and 2.

Figure 6 is a front elevational view of another modification of the support shown in Figures 1 and 2.

Figure 7 is a perspective view showing a modification of the base portion of the support shown in Figures 1, 2, 5, 6 and 17.

Figure 8 is a perspective view showing another modification of the base portion of the support shown in Figures 1, 2, 5, 6 and 17.

Figure 9 is a perspective view showing a shoe mounted on the base portion of the support shown in Figures 1, 2, 5, 6 and 17.

Figure 10 is a perspective view showing another form of shoe pivoted on the base portion of the support shown in Figures 1, 2, 5, 6 and 17.

Figure 11 is a side elevational view of a modified form of clamp for mounting the support on the under side of a vehicle axle.

Figure 12 is a side elevational view showing another modified form of clamp for mounting the support on the under side of a vehicle axle.

Figure 13 is still another modified form of clamp for mounting the support on the under side of a vehicle axle.

Figure 14 is a further modified form of clamp for mounting the support on the under side of a vehicle axle.

Figure 15 is a side elevational view showing another manner of positioning a support than that shown in Figure 4.

Figure 16 is a sectional view taken on line 16—16 of Figure 15.

Figure 17 is a front elevational view showing a leaf spring mounted on the form of support shown in Figure 6.

Figure 18 is a sectional view taken on line 18—18 of Figure 17.

Referring more particularly by numerals to the drawings in which the same and similar elements are designated by like symbols of reference throughout, and more particularly to Figure 1, there is shown the front portion of a conventional motor vehicle comprising a side frame member 1 supporting an engine 2 and crank case 3 and mounted at the front end on an axle 4 through a spring 5.

The axle as shown in Figure 2 is bifurcated at each end as at 6 and 7, and a stub axle is mounted between the furcations and held by a king pin 9. A stub shaft 11 projects from the axle 8 upon which wheels 12 are mounted in the conventional manner and hub caps 13 fitted on the end of the shaft. The axle 4 is formed with top and bottom flanges 14 and 15, better shown in Figure 4.

The preferred embodiment of this invention shown in Figures 1 to 4, comprises a support having a horizontally extended base portion 16 formed with angularly disposed upwardly projecting arms 17 and 18 turned over at the ends, as at 19 and 21. The turned over portions of the arms 19 and 21 may be provided with collars 22 and 23 adjacent the angular arms, better shown in Figure 2.

The portions 19 and 21 of the support are adapted to be pivoted in bearings 24 and 25, held on the under side of the bottom flange of the axle 4 by a plurality of clamps 26 bolted to plates 27 mounted across the top flange of the axle and held by nuts 28, as shown in Figures 2 and 3.

The support is mounted across a point at the longitudinal center of gravity of the vehicle and is of such a length that when it is vertically positioned, it will relieve the weight of the vehicle on tires 29 mounted on the wheels. If desired, the support may be constructed of sufficient length to remove the tires entirely from the roadway when placed upright.

As the support is free to swing it will be apparent that it will rest on the road bed when the vehicle on which it is mounted is stationary, but extending below the periphery of the tires, it will not be vertically positioned. To raise the end of the vehicle it is intended that it be driven backward if the support is positioned in the rear of the axle whereupon the base portion 16 will engage the surface upon which it rests and the front wheels will be lifted from the ground by the traction exerted by the rear wheels.

When the support is in an upright position and the weight of the vehicle on the tires relieved by the force exerted thereon, the vehicle may be held stationary in this position by the operator applying the brakes until the wheels are turned to the desired angle. The brakes may then be released and the car driven off the support. If the support is positioned in the front of the axle the front end may be raised by the reverse operation, that is by driving the vehicle forward. It will of course be manifest that this operation may be repeated the desired number of times until the vehicle has either been driven in or out of a confined area of the character of a parking space.

With further reference to Figure 1, there is shown a mechanism for operating the support. One end of a connecting rod 31 is pivoted to the arm 18 through a strap 32, and the other end hinged on a lever 33. The lever 33 is pivoted to an angle iron 34, fixed on the under side of the frame 1. In this manner when the lever is moved forward, the support may be raised to a horizontal position as depicted in Figure 4. The angle iron 34 is provided with a notch 35 adapted to receive a spring operated pin 36, the release of which is provided for by pushing a rod 37 extending through the top of the lever. Thus when the support is raised to the horizontal position, it may be fixed in place and not interfere with the road clearance of the vehicle. When it is desired to make use of the support, the catch is released by the operator pressing down the rod 37 allowing the support to be free to swing.

A leaf spring 38 is mounted on the axle 4 adapted to be engaged by the support when raised to the vertical position, so that by being held against the force exerted by the spring the support will have no tendency to rattle, giving rise to noise which is usually objectionable as well as allowing it to become loosened by constant movement.

A spring effect resides in the support by reason of the angular disposition of the arms 17 and 18, which lends to a greater efficiency of the device than would otherwise occur if the structure was more rigid. It is to be understood that, while the support is shown to be constructed of a single piece of material bent to the desired shape, it may be made up of separate segments suitably joined, if this structure is found to be more desirable.

It will be appreciated that the support is obviously subject to numerous modifications, such as, for example, those shown in Figures 5 and 6, in which the arms 17 and 18 are vertically positioned with respect to the base rather than angularly disposed as shown in Figure 2.

In Figure 6, the base portion is bent upwardly at the center as at 38. This construction may be found desirable where the device is employed on an uneven road bed. Also, a support of this character, as shown in Figures 17 and 18, may be provided with a leaf spring 39. In employing a spring it is preferred that the top of the bent portion be cut away as at 41 so that the spring may be bent thereover and thus a firmer fixture obtained than if the bar was all round. The spring 39 is joined on the underside of the bent portion by a rivet 42, and the ends allowed to terminate in prongs 43 and 44, extending below the level of the support. When a support provided with a spring of this character is lowered the spring will engage the road bed and prevent the base portion from slipping, bringing it immediately into position for lifting the wheels by movement of the vehicle.

The base portion of the support may be corrugated on the bottom as at 45 as shown in Figure 7 to add to the gripping effect thereof, and thus prevent sliding of the support on a road bed when it is desired to raise the wheels of a vehicle. Another form of support adapted to afford a gripping effect is illustrated in Figure 8, wherein the base portion as well as the arms thereof is constructed in polygonal shape so as to provide corners for engaging a surface.

In Figure 9 there is shown a shoe 46 fixed on the base portion 16 of the support. The shoe is preferably shown with a curved corrugated bottom 47 and adjustably held on the base portion by set screws 48. The shoe 46 is designed to afford a greater surface contact portion than is provided by the base portion of the same dimensions as the arms of the support. Another type of shoe 49 having a flat corrugated contact surface 51 is shown mounted on the base portion in Figure 10. This type of support is preferably pivoted on the base portion 16 so that it will engage a surface upon which it is lowered in a horizontal position and thus prevent any appreciable longitudinal movement of the support.

In Figures 11 to 14 inclusive there are shown several forms of clamp devices for mounting the support on the under side of a vehicle axle and fixing the same to the lower flange thereof, in distinction to the mounting shown in Figures 5 and 6, where the clamps extend over and are secured on the top of the axle.

The clamp shown in Figure 11 comprises a body portion 52 adapted to be fitted on the under side of the axle 4 and having a bearing formed therein for receiving the turned over portion 21 of the support. The bottom portion 52 of the clamp is provided with an integral projection 53 adapted to engage one side of the flange 15 of the axle. The other side of the clamp is formed with an integral projection 54 having a set screw 55 operating therein, adapted to engage the opposite side of the flange 15. The set screw 55 may be locked into position by a nut 56.

The clamp shown in Figure 12, similar to that just described, comprises a body portion 52 having a bearing formed therein for pivoting the bent over portion 21 of the support, and an integral projection 53 for engaging one side of the flange 15. A supplemental clamp portion 57 adapted to engage the opposite side of the flange 15 is bolted to the body portion 52 by a bolt 58 and the same held in place through the medium of a washer 59.

In Figure 13 there is shown a clamp formed with a bearing seat 61 adapted to be fitted on the under side of the axle 4 and receive the bent over portion 21 of the support. The portion 61 is provided with an integral projection 62 adapted to engage one side of the flange 15 of the axle, and the other side formed with an integral extension 63 upon which is adapted to be bolted a supplemental clamping section 64 engaging the opposite side of the flange 15. The two sections are held together by a bolt 65 and nut 66, a washer 67 being interposed between the nut and the bottom extension 63.

The clamp shown in Figure 14 comprises a bottom portion 68 adapted to receive a bearing 69 in which is pivoted the bent over portion 21 of the support. The bottom 68 of the clamp is formed with an integral projection 70 adapted to engage one side of the flange 15 of the axle and the other side forms an extension 71 upon which is adapted to be seated a supplemental clamp 72. The two sections of the clamp are held together by a bolt 73 and nut 74 in the same manner as the clamp sections shown in Figure 13, a washer 75 being interposed between the nut and the extension.

It will of course be apparent as well that numerous modifications may be made in the manner of raising and lowering the support. For example, there is shown in Figure 15 an operating mechanism of another character than that shown in Figures 1 and 4. A flexible cable 76 is pivoted to the strap 32 mounted on the arm 18 of the support, and conducted over a pulley 77 mounted on a steering mechanism casing 78 or other convenient part of a vehicle, and fastened to the end of a pull rod 79. The pull rod may be mounted on the casing 81 of a steering shaft 82 as shown in Figure 16 and secured thereon by straps 83 having conduits 84 for accommodating the rod.

The rod 79 is preferably bent over at the top as at 85 to afford a handle, and an additional strap 86 provided on the steering rod casing, having a pin 87 mounted therein to maintain the support in a raised position when the rod handle 85 is held by the same. By release of the handle 85 from the pin, the rod may be either pushed down or allowed to slide by the weight exerted by the support so that the latter may fall to the surface upon which it is desired to raise the vehicle.

In installing the device forming the subject matter of this invention on a vehicle, it is apparent that any one of the several supports which have been illustrated or other modifications thereof may be employed and the same fixed to the under side of the axle of the vehicle in any suitable manner such as by the use of any one of the types of clamp constructions disclosed herein. The clamps shown in Figures 11 to 14 provide for attaching the device to the lower part of an axle having a bottom flange, which construction may be found convenient where it is undesirable to secure the device over the top of the axle. The invention is of course in no wise limited to the particular operating devices described as the same, or of course subject to numerous modifications, any mechanism capable of raising and lowering the support being satisfactory for the purpose of practicing the invention.

In the use of the support if a free turning of the steering wheels is desired when the vehicle upon which it is mounted is in a stationary position, the support may be lowered to contact with the roadway on which the vehicle is resting, whereupon by movement of the car in either direction according to the positioning of the support as shown in Figures 4 and 15 the weight on the front wheels may be relieved. This operation may obviously be repeated until the desired result has been achieved, whereupon the support may be raised above the road clearance of the vehicle and secured in position.

There is accomplished by this invention a device for simultaneously relieving the weight on the steering wheels of a vehicle, upon movement of the vehicle, that affords facility in directing a course, while the vehicle is operating in confined areas, which device may be raised above the road clearance of the vehicle when not in use.

While I have shown and described the preferred embodiment of my invention, I wish it to be understood that I do not confine myself to the precise details of construction herein set forth, by way of illustration, as it is apparent that many changes and variations may be made therein, by those skilled in the art, without departing from the spirit of the invention, or exceeding the scope of the appended claims.

I claim:

1. A vehicle lifting device comprising a support having an extended horizontal base portion upwardly bent at the center providing contact legs at the ends, means fixed around the center of the bent portion and extending below the level of the support to retard movement of the support when lowered, vertically positioned upwardly projecting arms turned over at the ends formed on the base portion, and means to pivot the ends of the support on the underside of a vehicle axle.

2. In a vehicle lifting device for elevating one end of a vehicle upon movement of the vehicle onto the device, said device comprising a support having an extended horizontal base portion upwardly bent at the center so as to provide contact points at the ends vertically positioned, upwardly projecting arms turned over at their ends positioned upon the base portion, the ends of said support being pivoted to the underside of an axle of the vehicle, means fixed around the center of the bent portion of said base and below the level of the support to retard movement of the support when lowered, said means comprising a leaf spring engaging said support, the spring having a plurality of prongs each of which extends below the level of the support.

3. A vehicle lifting device comprising a support leg pivoted across the longitudinal axis of one end of the vehicle, normally adapted to be held raised, whereon the end of the vehicle to which the support leg is pivoted may be elevated by backward or forward movement of the vehicle.

4. A vehicle parking device comprising means attached to one end of the vehicle across the longitudinal axis thereof and adapted to swing on each side of the vertical whereon the end of the vehicle to which the elevating means is attached may be elevated by backward or forward movement of the end of the vehicle on the elevating means.

5. A vehicle parking device comprising means attached to one end of the vehicle across the longitudinal axis thereof and adapted to swing on each side of the vertical whereon the end of the vehicle to which the elevating means is attached may be elevated by backward or forward movement of the end of the vehicle on the elevating means, and means to raise and lower the elevating means from the driving compartment of the vehicle.

6. A vehicle lifting device comprising a support leg pivoted across the longitudinal axis of a vehicle adjacent one end thereof whereon the end of the vehicle may be elevated by backward or forward movement on the support, adapted to swing past the vertical in any direction, and means to maintain the support in raised inoperative position against spring tension to prevent rattling.

7. A device for elevating that part of a vehicle to which the steering wheels are attached comprising elevating means pivotally supported at that part of the vehicle on an axis laterally disposed to the longitudinal axis of the vehicle to swing on both sides of the vertical, said means being adapted to engage the ground to elevate that part of the vehicle by forward or backward movement of the vehicle, depending upon which side of the vertical the elevating means is in engagement with the roadbed.

8. A device for relieving the steering wheels of a vehicle of at least part of the weight of the vehicle which they carry, comprising means pivotally connected on the vehicle on an axis laterally positioned to the longitudinal axis of the vehicle, said means comprising a ground support member adapted to engage the roadbed on either forward or backward movement of the vehicle, depending upon the position of the ground support on the roadbed relative to its operative vertical position to relieve the steering wheels of the vehicle of the weight of the vehicle.

9. A device for relieving the steering wheels of a vehicle of the weight of a vehicle, comprising a steering wheel axle, means attached to said axle for elevating that end of the vehicle, said means being adapted to swing on both sides of the vertical for engaging the ground to elevate the steering wheel axle to relieve the steering wheels of weight by either forward or backward movement of the vehicle, depending upon the initial position of said elevating means.

10. In a vehicle having steering wheels, a device of the character described comprising a compression element supported on the vehicle for movement beyond the vertical and on either side thereof for engaging the ground to relieve the weight at least in part on at least one of the steering wheels by either forward or backward movement of the vehicle, depending upon the initial position of said compression element.

11. A device for relieving the steering wheels of a vehicle of the weight of the vehicle comprising a compression element supported on the vehicle for elevating that portion of the vehicle adjacent the steering wheels and adapted for movement beyond the vertical and on either side thereof for engaging the ground to elevate said portion of the vehicle by either forward or backward movement of the vehicle, depending upon the initial position of said compression element.

12. In a vehicle having steering wheels, a device of the character described comprising a compression element supported on the vehicle for movement beyond the vertical and on either side thereof for engaging the ground to relieve the weight at least in part on a least one of the steering wheels by either forward or backward movement of the vehicle, depending upon the initial position of said compression element, and means to raise the compression element out of operative position.

13. A device for relieving the steering wheels of a vehicle of the weight of the vehicle comprising a compression element supported on the vehicle for elevating that portion of the vehicle adjacent the steering wheels and adapted for movement beyond the vertical and on either side thereof for engaging the ground to elevate said portion of the vehicle by either forward or backward movement of the vehicle, depending upon the initial position of said compression element, and means to raise the compression element out of operative position.

14. In a vehicle having steering wheels, a device of the character described comprising a compression element supported on the vehicle for movement beyond the vertical and on either side thereof for engaging the ground to relieve the weight at least in part on at least one of the steering wheels by either forward or backward movement of the vehicle, depending upon the initial position of said compression element, and means to raise the compression element out of operative position and hold it locked against return thereto.

15. A device for relieving the steering wheels of a vehicle of the weight of the vehicle comprising a compression element supported on the vehicle for elevating that portion of the vehicle adjacent the steering wheels and adapted for movement beyond the vertical and on either side thereof for engaging the ground to elevate said portion of the vehicle by either forward or backward movement of the vehicle, depending upon the initial position of said compression element, and means to raise the compression element out of operative position and hold it locked against return thereto.

JOHN L. BARR.